US011268334B2

(12) United States Patent
Song et al.

(10) Patent No.: US 11,268,334 B2
(45) Date of Patent: Mar. 8, 2022

(54) REAL-TIME DOWNHOLE DRILLING MUD VISCOSITY AND DENSITY ESTIMATIONS

(71) Applicant: Halliburton Energy Services, Inc., Houston, TX (US)

(72) Inventors: Xingyong Song, Houston, TX (US); Jason D. Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 104 days.

(21) Appl. No.: 15/323,836

(22) PCT Filed: Jul. 13, 2016

(86) PCT No.: PCT/US2016/042020
§ 371 (c)(1),
(2) Date: Jan. 4, 2017

(87) PCT Pub. No.: WO2017/011516
PCT Pub. Date: Jan. 19, 2017

(65) Prior Publication Data
US 2017/0198536 A1    Jul. 13, 2017

Related U.S. Application Data

(60) Provisional application No. 62/191,727, filed on Jul. 13, 2015.

(51) Int. Cl.
*E21B 21/00* (2006.01)
*E21B 21/08* (2006.01)
(Continued)

(52) U.S. Cl.
CPC .............. *E21B 21/00* (2013.01); *E21B 21/08* (2013.01); *E21B 41/0092* (2013.01);
(Continued)

(58) Field of Classification Search
CPC .... E21B 21/08; E21B 2049/085; E21B 47/00; E21B 49/10; E21B 49/08; E21B 44/00; E21B 21/01; E21B 7/06; E21B 44/04
See application file for complete search history.

(56) References Cited

U.S. PATENT DOCUMENTS

| 3,301,323 A | 1/1967 | Parsons |
| 8,839,668 B2* | 9/2014 | Hemsing ............... E21B 49/008 |
| | | 73/152.27 |

(Continued)

FOREIGN PATENT DOCUMENTS

WO    2010085401 A1    7/2010

OTHER PUBLICATIONS

ISR/WO for PCT/US2016/042020 dated Nov. 9, 2016.

*Primary Examiner* — Tony Tran
(74) *Attorney, Agent, or Firm* — Gilliam IP PLLC

(57) ABSTRACT

Methods and systems for enhancing workflow performance in the oil and gas industry may estimate the properties of drilling muds (e.g., density and/or viscosity) located downhole with methods that utilize real-time data, estimated drilling mud properties, and mathematical models. Further, the methods described herein may optionally account for the uncertainties induced by sensor readings and dynamic modeling. For example, a method may include circulating a drilling mud through a mud circulation system; performing a plurality of measurements from various sensors in a mud circulation system; modeling in real-time drilling mud flow dynamics in the drilling mud using a mathematical dynamics model; predicting physical states of the drilling mud with the mathematical dynamics model, thereby producing model physical state predictions; inputting the measurements into the mathematical dynamics model; and adjusting discrep- (Continued)

ancies between the model physical state predictions and the measurements using the mathematical dynamics model.

10 Claims, 1 Drawing Sheet

(51) Int. Cl.
*E21B 47/10* (2012.01)
*G06F 30/20* (2020.01)
*E21B 41/00* (2006.01)
*G06F 17/11* (2006.01)
*G06N 5/04* (2006.01)
*G06F 111/10* (2020.01)

(52) U.S. Cl.
CPC .............. *E21B 47/10* (2013.01); *G06F 17/11* (2013.01); *G06F 30/20* (2020.01); *G06N 5/04* (2013.01); *G06F 2111/10* (2020.01)

(56) References Cited

U.S. PATENT DOCUMENTS

| | | |
|---|---|---|
| 9,206,671 B2 | 12/2015 | Shetty et al. |
| 9,212,538 B2 | 12/2015 | Shetty et al. |
| 9,255,473 B2 | 2/2016 | Burress et al. |
| 2007/0087927 A1 | 4/2007 | Scott et al. |
| 2011/0220410 A1* | 9/2011 | Aldred .................... E21B 44/00 175/26 |
| 2012/0024602 A1 | 2/2012 | Larson |
| 2012/0118638 A1 | 5/2012 | Orbell et al. |
| 2014/0202772 A1 | 7/2014 | Kulkarni et al. |
| 2015/0039275 A1 | 2/2015 | Mikhailov et al. |

\* cited by examiner

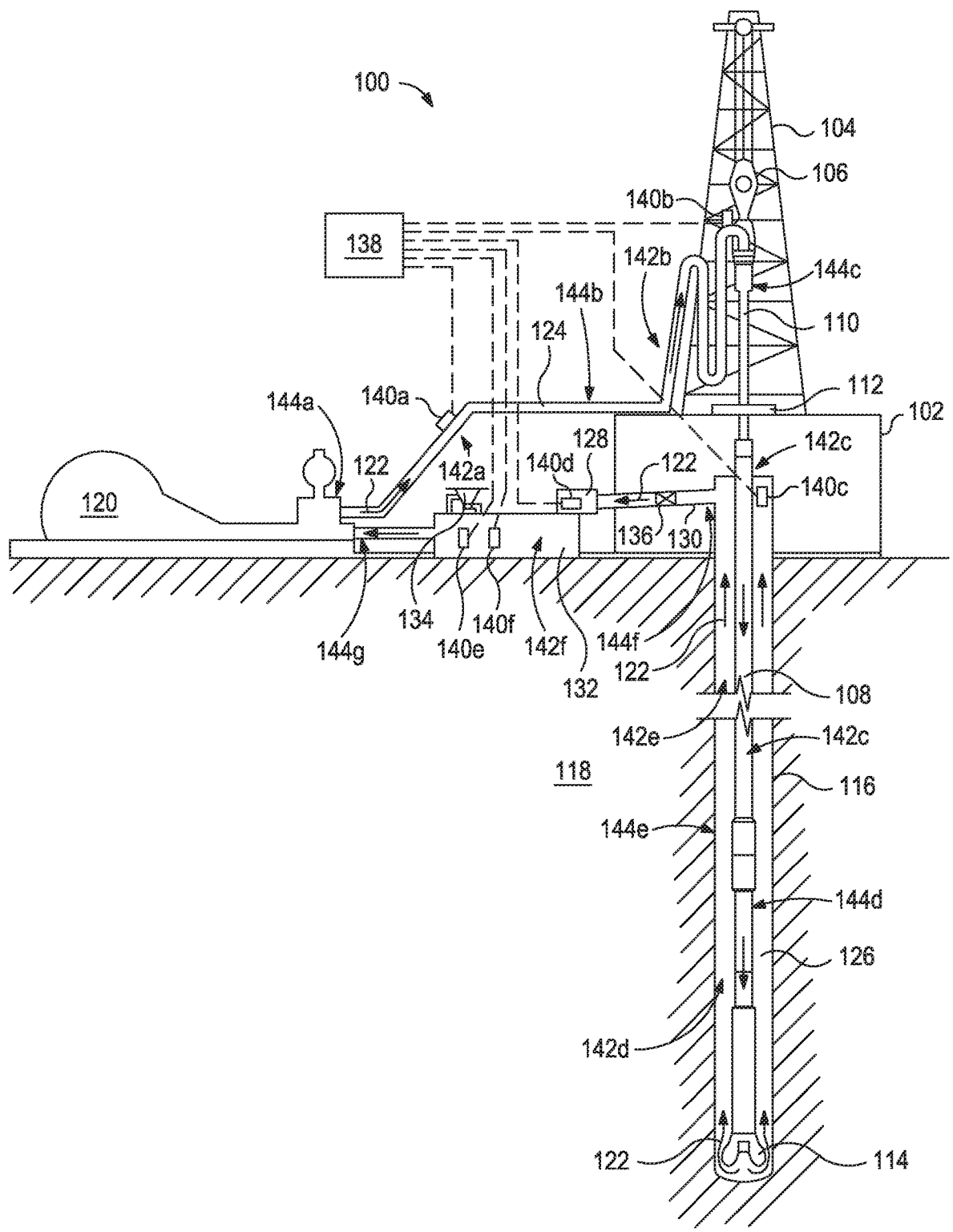

REAL-TIME DOWNHOLE DRILLING MUD VISCOSITY AND DENSITY ESTIMATIONS

BACKGROUND

The accurate and reliable knowledge of drilling mud properties, especially the density and viscosity, at the drill bit is valuable. However, due to the lack of sensors close to the drill bit, it can be challenging to obtain the appropriate information in a timely manner. Because the fluid properties can typically only be measured or tested on the surface, there is a delay between the measurement and the current fluid property down-hole. In other words, most "real-time" measurements are on the fluids that have circulated back to the surface, which may have different properties from the fluids closer to the drill bit.

BRIEF DESCRIPTION OF THE DRAWINGS

The following figures are included to illustrate certain aspects of the embodiments, and should not be viewed as exclusive embodiments. The subject matter disclosed is amenable to considerable modifications, alterations, combinations, and equivalents in form and function, as will occur to those skilled in the art and having the benefit of this disclosure.

FIG. 1 illustrates an exemplary mud circulation system suitable for implementing the methods described herein.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for enhancing workflow performance in the oil and gas industry. More specifically, the present application relates to estimating the properties of drilling muds located downhole with methods that utilize real-time data, estimated drilling mud properties, and mathematical models. Further, the methods described herein account for the uncertainties induced by sensor readings and dynamic modeling so they may be managed and/or treated systematically in the estimation framework to enable optimal estimation with low uncertainties.

FIG. 1 illustrates an exemplary mud circulation system 100 (e.g., a drilling system) suitable for implementing the methods described herein. While FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the mud circulation system 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates mud 122 through a feed pipe 124 and to the kelly 110, which conveys the mud 122 downhole through the interior of the drill string 108 and out through one or more orifices in the drill bit 114. The mud 122 is then circulated back to the surface via an annulus 126 defined between the drill string 108 and the walls of the borehole 116. At the surface, the recirculated or spent mud 122 exits the annulus 126 and may be conveyed through chokes 136 (also referred to as a choke manifold) to one or more mud cleaning unit(s) 128 (e.g., a shaker, a centrifuge, a hydrocyclone, a separator (including magnetic and electrical separators), a desilter, a desander, a separator, a filter, a heat exchanger, any fluid reclamation equipment, and the like) via an interconnecting flow line 130. After passing through the mud cleaning unit(s) 128, a "cleaned" mud 122 is deposited into a nearby retention pit 132 (e.g., a mud pit or mud tank). While illustrated at the outlet of the wellbore 116 via the annulus 126, those skilled in the art will readily appreciate that the mud cleaning unit(s) 128 may be arranged at any other location in the drilling assembly 100 to facilitate its proper function without departing from the scope of the disclosure.

At the retention pit 132 (or before or after), the mud circulation system may include one or more mud treatment units. The mud 122 may be treated to change its composition and properties. For example, weighting agents like barite may be added to the mud 122 to increase its density. In another example, base fluid may be added to the mud 122 to decrease its density. In the illustrated mud circulation system 100, the addition of materials to the mud 122 may be achieved with a mixer 134 communicably coupled to or otherwise in fluid communication with the retention pit 132. The mixer 134 may include, but is not limited to, mixers, mixing hopper, flow paths, and related mixing equipment known to those skilled in the art. In other embodiments, however, the materials may be added to the mud 122 at any location in the drilling assembly 100. In at least one embodiment, for example, there could be more than one retention pit 132, such as multiple retention pits 132 in series. Moreover, the retention pit 132 may be representative of one or more fluid storage facilities and/or units where the materials may be stored, reconditioned, and/or regulated until added to the mud 122.

The various components of the mud circulation system 100 may further include one or more sensors, gauges, pumps, compressors, and the like used store, monitor, regulate, convey, and/or recondition the exemplary muds 122 (e.g., sensors and gauges to measure the composition and/or pressure of the mud, compressors to change the pressure of the mud, and the like).

While not specifically illustrated herein, the disclosed mud circulation system 100 may further include drill collars, mud motors, downhole motors and/or pumps associated with the drill string 108, MWD/LWD tools and related telemetry equipment, sensors 140 or distributed sensors associated with the components of the system 100 (e.g., the drill string 108, the retention pit 132, the choke 136, the feed pipe 124, the pump 120, and the kelly 110, and the mud cleaning unit(s) 128), downhole heat exchangers, valves and corresponding actuation devices, tool seals, packers and other wellbore isolation devices or components, and the like. The mud circulation system 100 may also further include a control system 138 communicably coupled to various components of the mud circulation system 100 (e.g., sensors 140) and be capable of executing the mathematical algorithms, methods, and mud circulation system control described herein.

As illustrated, system 100 includes six sensors: sensor 140a along the feed pipe proximal to the pump 120 relative to the kelly 110 for measuring mud pressure, sensor 140b along the feed pipe just before the kelly 110 for measuring mud flow rate, sensor 140c in or at the wellbore 116 for measuring mud pressure, sensor 140d at a mud cleaning unit 128 like a shaker for measuring mud weight, sensor 140e at the retention pit 132 for measuring the mud viscosity, and sensor 140f at the mud pit 132 for measuring mud density.

Some embodiments may provide effective and reliable downhole estimations of mud properties using an estimator with at least four components: a mathematical dynamics model (also referred to as the dynamics model), a measurement fusion mechanism, a feedback loop, and an uncertainty mechanism.

As used herein, the term "mathematical dynamics model" refers to a series of algorithms that describes the drilling mud flow dynamics together with the dynamics for drill bit cuttings in real time. As used herein, the term "measurement fusion mechanism" refers to a series of probability-based algorithms that fuses all the measurements from the sensors 140. As used herein, the term "uncertainty mechanism" refers to a series of algorithms that calculate and update the uncertainty intervals for the dynamics model.

First, the mathematical dynamics model is used to calculate an approximate downhole fluid density and viscosity.

Second, the measurement fusion mechanism fuses all the measurements including the fluid viscosity and density measurement performed at the surface, the flow pressure measurement at different locations along the flow passage, the temperature measurement, and other measurements made in the mud circulation system. The fusion of all the available sensor measurements should be conducted in a systematical fashion and may improve the downhole fluid property estimates by enhancing the robustness of the dynamic model. Moreover, if there are redundancies in sensor measurement (for instance, multiple sensors measuring viscosity of the drilling mud), then the readings from different sensors can be fused together with probability based techniques, so that the viscosity measurement estimation after combining these reading can have better accuracy and lower uncertainty.

Third, the fusion of these measurements may then be fed back via the feedback loop to the dynamics model to adjust any discrepancies between the model states prediction and the actual measurements. This allows for the model to be adapted to offer better estimations of real-time downhole mud properties.

The last component is a mechanism of determining/updating the uncertainty intervals for the dynamics model estimation, so that the corrected uncertainty level can be used for estimation in the following iteration.

An example of the dynamics model describing the mud flow dynamics is described in the following equations. In some instances, the dynamics model may be in other forms based on different assumptions on the fluid dynamics. No matter the form of the dynamics model, the sensor fusion method may be applied in a similar way.

Referring again to FIG. 1, from the pump 120 to the retention pit 132, the entire fluid circulation system forms a closed-loop, which could be further divided into N sections. In the present example, the mud circulation system is divided into 6 sections 142: section 142a from the pump 120 through a portion of the feed pipe 124 (illustrated between point 144a and point 144b), section 142b from the feed pipe 124 to the kelly 110 (illustrated between point 144b and point 144c), section 142c from the kelly 110 through a portion of the drill string 108 (illustrated between point 144c and point 144d), section 142d from the drill string 108 through a portion of the annulus between the drill string 108 and the wellbore 116 (illustrated between point 144d and point 144e), section 142e from the annulus to the choke 136 (illustrated between point 144e and point 144f), and section 142f from the choke 136 to the retention pit 132 (illustrated between point 144f and point 144g). This illustrates an exemplary section division that alternatively may be done in a symmetric manner where half of the sections are in the flowing-down loop (i.e., flow from surface to the bottom), and the other half of the sections are in the return loop (i.e., flow with cuttings circulating back to the surface).

Once the system 100 is divided into N number of sections 142, the rate of change of pressure ($\dot{P}_1$, $\dot{P}_2$, ..., $\dot{P}_N$) are calculated for each section 142 using the dynamics models described in Equations (1)-(5).

$$I\omega_{pump} = T_{engine} - P_{pump} Disp_{pump} \qquad \text{Equation (1)}$$

$$\dot{P}_1 = \frac{\beta}{v_1}\left[A_{orifice1}C_d\sqrt{\frac{2(P_{pump} - P_1 + \rho_0 g L_0)}{\rho_1}} - A_{orifice2}C_d\sqrt{\frac{2(P_1 - P_2 + \rho_1 g L_1)}{\rho_1}}\right] + \text{other terms} \qquad \text{Equation (2)}$$

$$\dot{P}_2 = \frac{\beta}{v_2}\left[A_{orifice2}C_d\sqrt{\frac{2(P_i - P_2 + \rho_1 g L_1)}{\rho_2}} - A_{orifice3}C_d\sqrt{\frac{2(P_2 - P_3 + \rho_2 g L_2)}{\rho_2}}\right] + \text{other terms} \qquad \text{Equation (3)}$$

$$\dot{P}_{\frac{N}{2}+1} = \frac{\beta}{v_{\frac{N}{2}+1}}\left[A_{orifice(\frac{N}{2}+1)}C_d\sqrt{\frac{2\left(P_{\frac{N}{2}} - P_{\frac{N}{2}+1} + \rho_{\frac{N}{2}} g L_{\frac{N}{2}}\right)}{\rho_{\frac{N}{2}+1}}} - A_{orifice(\frac{N}{2}+2)}C_d\sqrt{\frac{2\left(P_{\frac{N}{2}+1} - P_{\frac{N}{2}+2} + \rho_{\frac{N}{2}+1} g L_{\frac{N}{2}+1}\right)}{\rho_{\frac{N}{2}+1}}}\right] + \text{other terms} \qquad \text{Equation (4)}$$

$$\dot{P}_N = \frac{\beta}{v_N}\left[A_{orificeN}C_d\sqrt{\frac{2(P_{N-1} - P_N + \rho_{N-1} g L_{N-1})}{\rho_N}} - A_{orifice(tank)}C_d\sqrt{\frac{2(P_N - P_{tank} + \rho_N g L_N)}{\rho_N}}\right] + \text{other terms} \qquad \text{Equation (5)}$$

where $P_1$, $P_2$, ..., $P_N$ are the pressures in the chamber sections divided as shown in FIG. 1; $P_{pump}$ is the pressure at the pump 120, $P_{tank}$ is the pressure at the retention pit 132, $C_d$ is the flow discharge coefficient; $\rho$ is the fluid/mud density for each specific chamber; g is the standard gravity, $A_{orifice}$ is the area of the fluid channel cross-section, v is the chamber volume for each section divided, $\beta$ is the fluid bulk modulus, $\omega_{pump}$ is the pump rotational speed, $T_{engine}$ is the engine torque driving the mud pump, and L is the chamber length of each divided section.

Given the dynamic model above, a series of model outputs can be selected, where they are typically selected if sensors exist to measure those variables. For example, the dynamics models described in Equations (1)-(5) may be used to model the mud circulation system 100. Then, based on that model, properties of each section 142 may be calculated. The choice of which property to output for each section 142 may be based on the sensors in the section 142. For example, section 142f includes viscosity sensor 140e and density sensor 140f, so the output for section 142f may be viscosity and density. Equations (6)-(11) are exemplary algorithms for deriving properties from the modeled mud circulation system, where $y_1$ and $y_2$ are pressures, $y_3$ is flow rate, $y_4$ is mud cutting weights per minute, $y_5$ is viscosity, and $y_6$ is density.

$$y_1 = P_1 \qquad \text{Equation (6)}$$

$$y_2 = P_i \qquad \text{Equation (7)}$$

$$y_3 = A_{orificeN} C_d \sqrt{\frac{2(P_N - P_{N-1} - \rho_N g L_N)}{\rho_N}} \qquad \text{Equation (8)}$$

$$y_4 = f(ROP, \text{rock density}) \qquad \text{Equation (9)}$$

$$y_5 = \frac{y_4}{y_4 + \rho_{clean\,mud} A_{orifice(\frac{N}{2}+1)} C_d \sqrt{\frac{2(P_{\frac{N}{2}} - P_{\frac{N}{2}+1} - \rho_{\frac{N}{2}} g L_{\frac{N}{2}})}{\rho_{\frac{N}{2}+1}}}} \text{viscosity}_{cuttings} + \qquad \text{Equation (10)}$$

$$\frac{\rho_{clean\,mud} A_{orifice(\frac{N}{2}+1)} C_d \sqrt{\frac{2(P_{\frac{N}{2}} - P_{\frac{N}{2}+1} - \rho_{\frac{N}{2}} g L_{\frac{N}{2}})}{\rho_{\frac{N}{2}+1}}}}{y_4 + \rho_{clean\,mud} A_{orifice(\frac{N}{2}+1)} C_d \sqrt{\frac{2(P_{\frac{N}{2}} - P_{\frac{N}{2}+1} - \rho_{\frac{N}{2}} g L_{\frac{N}{2}})}{\rho_{\frac{N}{2}+1}}}} \text{viscosity}_{clean\,mud}$$

$$y_6 = \frac{\rho_{clean\,mud} A_{orifice(\frac{N}{2}+1)} C_d \sqrt{\frac{2(P_{\frac{N}{2}} - P_{\frac{N}{2}+1} - \rho_{\frac{N}{2}} g L_{\frac{N}{2}})}{\rho_{\frac{N}{2}+1}}}}{A_{orifice(\frac{N}{2}+1)} C_d \sqrt{\frac{2(P_{\frac{N}{2}} - P_{\frac{N}{2}+1} - \rho_{\frac{N}{2}} g L_{\frac{N}{2}})}{\rho_{\frac{N}{2}+1}}}} \qquad \text{Equation (11)}$$

where the flow rate $y_3$ is calculated based on the pressure difference between two adjacent chambers, the weight of cuttings $y_4$ at the drill bit is a function of rate of penetration (ROP), rock density, and the like, the viscosity $y_5$ at the drill bit is obtained based on the viscosity of the cuttings and that of the clean mud together with an estimate of fractions of the cuttings and mud at the downhole fluid, and the mud density at the drill bit is estimated with the input of cuttings weight and clean mud weight at the drill bit.

While the foregoing calculations are based on pressure, drilling mud flow rate may be alternatively used in the equations.

The dynamics model above can be discretized and put in a generic form as:

$$X(k+1) = f_{flow\,dynamics}[X(k), T_{engine}] + \text{uncertainty}_{model}(k)$$

$$Y(k+1) = h[X(k)] + \text{uncertainty}_{measure}(k) \qquad \text{Equations (12)}$$

where X(k) is a vector containing all the state variables ($P_1$, $P_2$, ...) at step k; $f_{flow\,dynamics}$ is the flow dynamics function representing the flow/pressure dynamics Equations (1)-(5); Y is the vector containing all the output variables (e.g., the various $y_1$-$y_6$ for each section 142); uncertainty$_{model}$ is a vector containing the modeling uncertainty and noise terms; and uncertainty$_{measure}$ is a vector containing the measurement uncertainty and noise terms.

The sensor fusion algorithm estimating the viscosity and density may be summarized as the following equations:

$$\hat{X}(k+1) = f_{flow\,dynamics}[\hat{X}(k), T_{engine}] L(k) (Y_{measured}(k-N_{delay}) - h[\hat{X}(k-N_{delay})])$$

$$\hat{Y}(k) = h[\hat{X}(k)]$$

$$\text{viscosity}_{estimate}(k) = [0\ 0\ 0\ 0\ 1\ 0] \times h[\hat{X}(k)]$$

$$\text{density}_{estimate}(k) = [0\ 0\ 0\ 0\ 0\ 1] \times h[\hat{X}(k)] \qquad \text{Equations (13)}$$

where $\hat{X}(k)$ is the estimated state of pressures, downhole fluid conditions, and the like; $Y_{measured}$ (k-$N_{delay}$) is the measured outputs (a vector containing the fluid density measurement, viscosity measurement, flow rate measurement, pressure measurement, cutting weight measurement, and the like) back in $N_{delay}$ sampling time ago; $N_{delay}$ is the total number of sampling time needed for the cuttings to be flushed from downhole to the surface (which is dependent on the length of the well); and L(k) is the gain (described further below in Equations (14)).

The fusion method may fuse the physical measurement with a dynamic model by embedding the difference between the physical measurement and the model estimate. Since the measurement of the downhole fluid property happens only after the fluid is circulated back to the surface, the difference between the measurement and output estimate a certain time before is used to adjust the downhole fluid property estimate in real-time.

L(k) is the gain used for the sensor fusion framework. It is determined based on the model uncertainty (uncertainty$_{model}$) together with measurement uncertainty (uncertainty$_{measure}$) as:

$$P(k) = J_f \text{uncertainty}(k-1) J_f^T + Q(k-1)$$

$$L(k) = P(k) J_h^T [J_h P(k) J_h + R(k)]^{-1}$$

$$\text{uncertainty}(k) = [I - L(k) J_h] P(k) \qquad \text{Equations (14)}$$

where $J_f$ and $J_h$ are the Jacobian matrix the nonlinear function f and h, respectively; Q is the dynamics system process noise covariance matrix of uncertainty$_{model}$; R is the covariance matrix for the measured noise/uncertainty for uncertainty$_{measure}$; both Q and R are predetermined by off-line calibration or empirical estimation; and uncertainty(k) is the level of uncertainty for the estimated viscosity and density at step k from the sensor fusion algorithm.

As illustrated in the above description, the sensor fusion algorithm fused different sensor measurements (e.g., pressure, density, viscosity, flow rate, and the like) with a physical dynamic model and also a probability based uncertainty model for each sensor 140, so that the downhole viscosity and density information may be estimated based on the fusion of different sensor readings. Moreover, the sensor measurement for viscosity and density after the fluid is circulated back to the surface may be used to update/adapt the uncertainty interval for the real time viscosity/density estimate using a Kalman filter (as described in Equations (13)-(14)), Bayesian probability analysis, particle filter, learning algorithm (e.g., neural networks), and the like.

The downhole viscosity and density information may be used to determine the equivalent circulating density (ECD).

Further, the parameters of the mud circulation system (e.g., weight on bit, drilling mud flow rate, choke control, drill bit revolutions per minute, and the like) and/or the composition of the drilling mud (e.g., concentration of weighting agent, viscosifier, and the like) may be adjusted to achieve a desired downhole viscosity, desired downhole density, and/or desired ECD.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

The control system(s) described herein and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments of the present disclosure include Embodiment A, Embodiment B, and Embodiment C.

Embodiment A is a method comprising: circulating a drilling mud through a mud circulation system; performing a plurality of measurements from various sensors in a mud circulation system; modeling in real-time drilling mud flow dynamics in the drilling mud using a mathematical dynamics model; predicting physical states of the drilling mud with the mathematical dynamics model, thereby producing model physical state predictions; inputting the measurements into the mathematical dynamics model; and adjusting discrepancies between the model physical state predictions and the measurements using the mathematical dynamics model.

Embodiment B is a system comprising: a mud circulation system having a drilling mud flowing therethrough; a plurality of sensors coupled to the mud circulation system configured to perform measurements related to the drilling mud; and a non-transitory computer-readable medium configured to receive the measurements and encoded with instructions that, when executed, cause the mud circulation system to perform a method comprising: modeling in real-time drilling mud flow dynamics in the drilling mud using a mathematical dynamics model; predicting physical states of the drilling mud with the mathematical dynamics model, thereby producing model physical state predictions; inputting the measurements into the mathematical dynamics model; and adjusting discrepancies between the model physical state predictions and the measurements using the mathematical dynamics model.

Embodiment C is a non-transitory computer-readable medium encoded with instructions that, when executed, cause a mud circulation system to perform a method comprising: receiving a plurality of measurements from a plurality of sensors in the mud circulation system; modeling in real-time drilling mud flow dynamics in the drilling mud using a mathematical dynamics model; predicting physical states of the drilling mud with the mathematical dynamics model, thereby producing model physical state predictions; inputting the measurements into the mathematical dynamics model; and adjusting discrepancies between the model physical state predictions and the measurements using the mathematical dynamics model.

Embodiments A, B, and C may further include one or more of the following: Element 1: the method further comprising: estimating an uncertainty interval of the plurality of measurements and the mathematical dynamics model; and updating the uncertainty intervals for the mathematical dynamics model and the measurements, thereby producing an updated mathematical dynamics model; Element 2: the method further comprising: Element 1 and repeating foregoing steps: performing, modeling, estimating, and inputting steps with the updated mathematical dynamics mode; Element 3: the method further comprising: repeating foregoing steps: performing, modeling, and inputting steps with the updated mathematical dynamics mode; Element 4: the method further comprising: calculating a real-time downhole density of the drilling mud using the updated mathematical dynamics model; Element 5: the method further comprising: calculating a real-time downhole viscosity of the drilling mud using the updated mathematical dynamics model; Element 6: the method further comprising: calculating a real-time downhole density, a real-time downhole viscosity, or both of the drilling mud using the updated mathematical dynamics model; and calculating an equivalent circulating density based on the real-time downhole density, the real-time downhole viscosity, or both; Element 7: the method further comprising: Element 6 and changing an operational parameter of the mud circulation based on the equivalent circulating density; and Element 8: the method further comprising: Element 6 and changing a composition of the drilling mud of the mud circulation based on the equivalent circulating density. Exemplary combinations may include, but are not limited to, one of Elements 1-3 in combination with one or more of Elements 4-8; Elements 4 and 5 in combination; and Elements 6-8 in combination.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The following is claimed:

1. A system comprising:
   a mud circulation system having a drilling mud flowing therethrough;
   a plurality of sensors including a flow metric sensor and a drilling mud property sensor coupled to the mud circulation system; and
   a control system including a non-transitory computer-readable medium encoded with instructions that, when executed, cause one or more processors of the control system to:
      receive a plurality of measurements acquired by the plurality of sensors including at least one drilling mud flow dynamic and at least one drilling mud property;
      determine a set of flow dynamics values for the mud circulation system based on a dynamics model;
      determine a set of drilling mud property predictions based on the set of determined flow dynamics values;
      determine a difference between the set of drilling mud property predictions and one or more of the plurality of measurements;
      generate a fusion-determined drilling mud physical state value based on a gain value and the difference between the set of drilling mud property predictions and the one or more of the plurality of measurements; and
      change an operational parameter of the mud circulation system based on the fusion-determined drilling mud physical state value.

2. The system of claim 1, wherein the instructions further comprise instructions to cause the one or more processors to determine an uncertainty value of at least one of the plurality of measurements or the dynamics model, wherein the gain value is determined based on the uncertainty value.

3. The system of claim 1, wherein the instructions further comprise instructions to cause the one or more processors to:
   generate an updated dynamics model based on the fusion-determined physical state value; and
   determine a second fusion-determined physical state value based on the updated dynamics model.

4. The system of claim 1, wherein the instructions comprise instructions to cause the one or more processors to determine a real-time downhole density of the drilling mud based on the fusion-determined physical state value.

5. The system of claim 1, wherein the instructions further comprise instructions to cause the one or more processors to determine a real-time downhole viscosity of the drilling mud based on the fusion-determined physical state value.

6. The system of claim 1, wherein the instructions further comprise instructions to cause the one or more processors to:
   determine at least one of a real-time downhole density of the drilling mud and a real-time downhole viscosity of the drilling mud based on the fusion-determined physical state value; and
   determine at least one of an equivalent circulating density based on the real-time downhole density and the real-time downhole viscosity.

7. The system of claim 6, wherein the instructions to cause the one or more processors to change the operational parameter of the mud circulation system comprises instructions to cause the one or more processors to change a composition of the drilling mud of the mud circulation based on the equivalent circulating density.

8. The system of claim 1, wherein the operational parameter of the mud circulation system comprises at least one of a weight on bit, a drilling mud flow rate, a choke control, or a drill bit revolutions per minute, and wherein at least one of the set of output predictions comprises a density prediction of the drilling mud or a viscosity prediction of the drilling mud.

9. The system of claim 1, wherein the at least one drilling mud property comprises at least one of a drilling mud density and a drilling mud viscosity.

10. The system of claim 9, wherein the set of drilling mud property predictions include a predicted drilling mud density and a predicted drilling mud viscosity.

\* \* \* \* \*